M. C. BRELSFORD.
Harvester Rake.
No. 31,106. Patented Jan. 15, 1861.
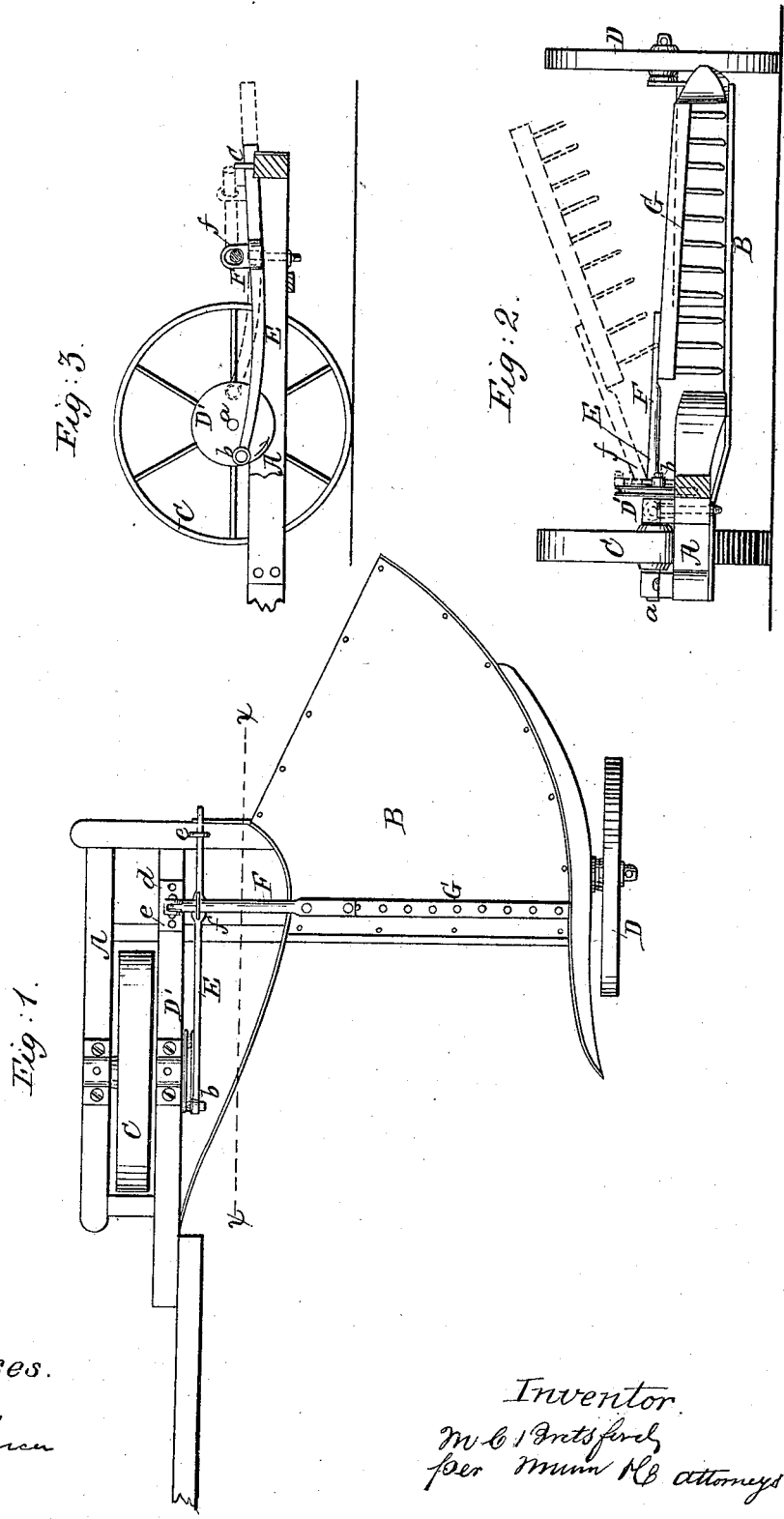
Witnesses.
J W Coombs
R S Spencer
Inventor.
M C Brelsford
per Munn & Co attorneys

UNITED STATES PATENT OFFICE.

M. C. BRELSFORD, OF GIRARD, ILLINOIS.

IMPROVEMENT IN RAKES FOR REAPERS.

Specification forming part of Letters Patent No. 31,106, dated January 15, 1861.

*To all whom it may concern:*

Be it known that I, M. C. BRELSFORD, of Girard, in the county of Macoupin and State of Illinois, have invented a new and Improved Raking Device for Harvesters; and I do hereby declare that the following is a full, clear, and exact description of the same, reference being had to the annexed drawings, making a part of this specification, in which—

Figure 1 is a plan or top view of my invention; Fig. 2, a front view of same; Fig. 3, a side sectional view of same, taken in the line *x x*, Fig. 1.

Similar letters of reference indicate corresponding parts in the several figures.

This invention relates to an improvement in that class of raking devices in which a vibrating rake is employed, the same being so operated as to pass over the platform in the arc of a circle and rake the cut grain therefrom, the rake rising at the termination of its backward stroke above the platform, and proceeding to its front end, to again descend and perform its work.

The object of the within-described invention is to obtain a simple means for operating the rake as above specified, and one that may be applied to any form of harvester in use.

To enable those skilled in the art to fully understand and construct my invention, I will proceed to describe it.

A represents the main frame of a harvester, and B the platform, the latter being attached to the former in any proper way. The main frame A has the driving-wheel C fitted in it, as usual, and the outer end of the platform is supported by a grain-wheel, D. On the inner end of the axle *a* of the wheel C there is placed a pulley, D', said pulley having a rod, E, attached to it near its periphery, as shown at *b*. The rod E is parallel with the main frame A, and the back end of said rod is fitted in an eye or guide, *c*, at the back part of the main frame.

F is a rake-bar, which has the rake G attached to one end. The rake may be of ordinary construction, as shown clearly in Fig. 2. The opposite end of the bar F is attached by a joint, *d*, to a bolt, *e*, which is fitted loosely in the main frame A, and allowed to turn freely therein. The rake-bar F passes loosely through an eye, *f*, on the rod E.

The few parts above described comprise the whole of the rake-operating mechanism, and it will be seen that as the machine is drawn along the pulley D' will operate the rod E with a crank movement, the guide *c* retaining the rod in proper position, and the latter vibrating the rake G, which traverses over the platform and rakes the grain therefrom during the passage of the connection *b* underneath the axle *a*, the upward and forward movement of the rake being given during the passage of said connection *b* over the axle *a*. During the backward movement of the rake over the platform the rod E bears on the rake-bar F, so that the rake is kept snugly to its work on the platform, moving over it in a parallel plane, and during the elevated forward movement of the rake the rod E has its bearing on the back end of the main frame A in guide *c*.

The whole device is extremely simple and efficient, and may be applied to any harvester in use at a trifling expense.

Having thus described my invention, what I claim as new, and desire to secure by Letters Patent, is—

The combination, substantially as herein shown and described, of the rake-bar F with a pitman-rod, E, that has one end attached to a driving-crank, while the other end slides through a strap or eye upon the frame or equivalent support, so that when the driving-crank is revolved the said rod E will be caused alternately to rise and fall, and also to move back and forth, and impart a corresponding movement to the rake-bar, whereby the rake is made to sweep across the surface of the platform, then rise, then move forward, then descend to the platform, and then sweep, as before.

M. C. BRELSFORD.

Witnesses:
 JOHN BELLAMY,
 JAS. D. METCALF.